US011328293B2

(12) United States Patent
Plomske et al.

(10) Patent No.: US 11,328,293 B2
(45) Date of Patent: *May 10, 2022

(54) SYSTEMS AND METHODS FOR MULTI-MERCHANT TOKENIZATION

(71) Applicant: Worldpay, LLC, Symmes Township, OH (US)

(72) Inventors: Michelle K. Plomske, Durango, CO (US); Charles E. Watts, Durango, CO (US); Matthew D. Ozvat, Durango, CO (US)

(73) Assignee: Worldpay, LLC, Symmes Township, OH (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/887,638

(22) Filed: May 29, 2020

(65) Prior Publication Data

US 2020/0294044 A1   Sep. 17, 2020

Related U.S. Application Data

(63) Continuation of application No. 16/412,042, filed on May 14, 2019, now Pat. No. 10,762,500, which is a continuation of application No. 13/563,534, filed on Jul. 31, 2012, now Pat. No. 10,339,524.

(51) Int. Cl.
*G06Q 20/38* (2012.01)
(52) U.S. Cl.
CPC .............................. *G06Q 20/38215* (2013.01)
(58) Field of Classification Search
CPC .................................................. G06Q 20/38215

USPC ............................................................ 705/64
See application file for complete search history.

(56) References Cited

U.S. PATENT DOCUMENTS

| | | |
|---|---|---|
| 2004/0139008 A1 | 7/2004 | Mascavage |
| 2009/0171759 A1 | 7/2009 | McGeehan |
| 2010/0145860 A1 | 6/2010 | Pelegero |
| 2010/0276484 A1 | 11/2010 | Banerjee et al. |
| 2011/0307714 A1 | 12/2011 | Comrie et al. |

(Continued)

OTHER PUBLICATIONS

KIPO, ISA/KR, "International Search Report and Written Opinion" in PCT Application No. PCT/US2013/052795, dated Dec. 19, 2013 (9 pages).

*Primary Examiner* — Chinedu C Agwumezie
(74) *Attorney, Agent, or Firm* — Bookoff McAndrews, PLLC

(57) ABSTRACT

Systems and methods for multi-merchant tokenization may include receiving a transaction from a point of sale terminal of a merchant, validating the merchant ID against merchant logs, and generating a token for the transaction. The token includes a primary account number, expiration, and a group ID. Additionally, the system provides the primary account number to a payment system and receives a response back. The response is then output back to the merchant along with the token. In subsequent transactions, the system may receive the token from a one point of sale terminal of the merchant. The system validates the merchant ID against merchant logs and ensures the merchant is configured for tokenization. The token is decrypted and the group ID is compared to the merchant ID in the merchant logs. When they match, the primary account number is provided to the payment system for approval.

20 Claims, 9 Drawing Sheets

(56) References Cited

U.S. PATENT DOCUMENTS

| | | | |
|---|---|---|---|
| 2011/0320344 A1* | 12/2011 | Faith | G06Q 30/0231 705/39 |
| 2012/0041881 A1* | 2/2012 | Basu | G06Q 20/3672 705/67 |
| 2012/0066044 A1* | 3/2012 | Honnef | G06Q 30/0601 705/26.1 |
| 2013/0110658 A1* | 5/2013 | Lyman | G06Q 20/3674 705/41 |
| 2016/0239835 A1* | 8/2016 | Marsyla | G06Q 20/3829 |

\* cited by examiner

SYSTEMS AND METHODS FOR MULTI-MERCHANT TOKENIZATION

CROSS-REFERENCE TO RELATED APPLICATION(S)

This patent application is a continuation of and claims the benefit of priority to U.S. application Ser. No. 16/412,042, filed on May 14, 2019, which is a continuation of and claims the benefit of priority to U.S. application Ser. No. 13/563,534, filed on Jul. 31, 2012 and issued on Jul. 2, 2019 as U.S. Pat. No. 10,339,524, the entireties of which are incorporated herein by reference.

BACKGROUND

This invention relates generally to systems and methods for multi-merchant tokenization of transaction payments. Such systems and methods enable merchants to increase security for payments and transactions, shifts storage of account information from central payment processor to the merchant, and provides for more seamless transactions across groups of related merchants.

Payment for a transaction, when done electronically, is subject to security breaches which may compromise sensitive financial data. Further, as point of sales systems become more advanced, more transactions are performed electronically, and as hackers become more sophisticated, security concerns are continually increasing.

in the early days of electronic transactions, dedicated magnetic card readers would scan a credit card's data and transfer it to a payment service for completion of the transaction. These communications were typically over a dial connection and required basic encryption in the reader device in order to maintain security of the packet.

Over time, the reader devices have become more advanced, often with internet connections and data input ports that enable malware to infect point of sales terminals. Further, as more and more retailers have moved to transfer of data over the internet, additional security features have been developed.

Most notably, "tokenization" is a means for replacing sensitive information with a "token" of data that is non-decryptable by the merchant (requires a third party decryption). Traditionally, tokenization in transaction payment systems would include storing the sensitive information at the payment processor in a centralized database, and supplying back an ID to the merchant. The ID would relate back to the account data, but if intercepted would not contain any sensitive information. This enables increased security because the sensitive information only needs to be transferred between the merchant and the payment service once. However, such prior systems are not without drawbacks. For example, by centrally locating account information for a wide variety of businesses, a single breach of security into the database could compromise a large number of accounts, in these prior systems. This is a very large risk for payment processors. Additionally, the token returned to the merchant is typically only redeemable by that merchant in further transactions. As such, prior tokenization efforts are limited to a single business line.

Often a merchant may have multiple locations that work together, and as such current systems may limit these merchants from all relying upon a single token. Thus, account information has to be input by the varied merchants individually in order to perform the transaction for a single customer.

It is therefore apparent that an urgent need exists for systems and methods for multi merchant tokenization for improved security for transaction payment processing. Such systems will have the added benefit of decentralizing sensitive account data in a manner which increases security of user data, while shifting risks away from the payment service.

SUMMARY

To achieve the foregoing and in accordance with the present invention, systems and methods for multi-merchant tokenization are provided. Such systems and methods enable improved security for transaction payment processing. Such systems will have the added benefit of decentralizing sensitive account data in a manner which increases security of user data, while shifting risks away from the payment service.

In some embodiments, multi-merchant tokenization may include receiving a transaction from a point of sale terminal of a merchant, validating the merchant ID against merchant logs, and generating a token for the transaction. The token includes a primary account number, expiration, and a group ID. Additionally, the system provides the primary account number to a payment system and receives a response back. The response is then output back to the merchant along with the token. Validation of the merchant ID ensures the merchant is configured for tokenization. In some embodiments, the transaction is encrypted when it is received. In this case the system also decrypts the transaction. The system may also encrypt the token.

The group ID enables only particular merchants to redeem the token. The system may associate merchants to the group ID. Thus when a token is received from a merchant, the system may query a database for merchant configuration, and approve or decline the transaction if the merchant configuration does or does not match the transaction, respectively. The database may be updated for changes in merchant configuration.

In subsequent transactions, the system may receive the token from a one point of sale terminal of the merchant. The system validates the merchant ID against merchant logs and ensures the merchant is configured for tokenization. The token is decrypted and the group ID is compared to the merchant ID in the merchant logs. When they match, the primary account number is provided to the payment system for approval.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily Obscure the present invention. The features and advantages of embodiments may be better understood with reference to the drawings and discussions that follow.

The following discussion relates to methods and systems for multi-merchant tokenization in a payment processor. Such systems and methods increase security for electronic transactions, reduce risks borne by the payment processor, and allow for seamless multi-merchant transactions without the need to repeatedly collect user account data.

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

Also note that particular consideration is made to credit card transactions due to the prevalence of these transactions. Despite this reference to credit cards, the disclosed systems and methods can apply equally well to any payment methods where sensitive information is being transferred. This may include debit transactions, gift card transactions, PayPal transactions, smart card transactions, mobile application transactions, and the usage of loyalty cards, to name but a few. Effectively, any circumstance where account numbers, or other sensitive information, is being transferred may be employed within the scope of the disclosed systems and methods.

I. Multi-Merchant Tokenization Systems

Figure 8A:
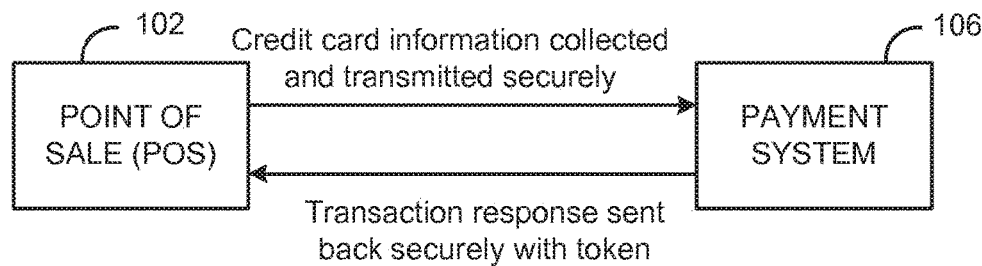
FIGS. 8A and 8B are example schematic block diagrams for mechanisms for secure transactions, in accordance with some embodiments.
Figure 8B:
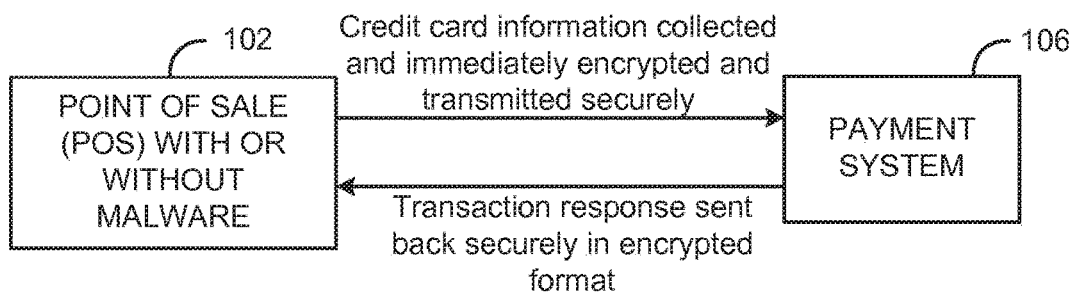

To facilitate this discussion, FIGS. 8A and 8B provide example block diagrams for methods for securely handling transaction payments, in accordance with some embodiments. In FIG. 8A, the point of sale terminal 102 may collect credit card information (or other sensitive payment information) and transfer the data securely to the payment system(s) 106, at 800a. Intermediary in this transaction is a payment processor which ensures validity of the request, and generates a multi-merchant token. The payment system(s) 106 returns a transaction response securely with the token generated by the payment processor to the merchant.

By relying upon a token, the merchant no longer has to send the credit card information for subsequent transactions and may instead utilize the token for follow-up activities. For example, a restaurant may initially run a transaction for the cost of a meal, and perform a follow-up transaction using the token for processing the tip. Another example may include recurring transactions for a gym membership. A retailer may use tokens for returns or price adjustments rather than resending sensitive transaction information.

In contrast to current tokenization systems, the presently disclosed systems and methods transfer a token with a unique makeup (including encrypted card data) that enables distributed storage of sensitive information, as well as the ability for multiple merchants to share the token for transactions. This may be of particular use in franchise or related businesses, where a customer's payment information may be processed by multiple merchants.

For example, a customer may purchase a good from location A from a franchise retailer. The customer then decides to return the item to location B which is within the same franchise, but may not be owned by the same entity. Instead of denying the transaction, or re-running the card using the presently disclosed system, the token may be leveraged to perform the transaction.

FIG. 8B illustrates a schematic block diagram illustrating end to end (E2E) encryption, at 800b. End to end encryption protects sensitive information from malware loaded upon a point of sale terminal, and may be employed in conjunction with multi-merchant tokenization.

In these systems, the card information is encrypted at the reader head, upon collection. Thus, the information conveyed from the reader to the rest of the POS system is already secure. Since the POS system may be infected by malware, this early encryption ensures that the data remains secure from the very start. While the currently disclosed systems and methods can be employed with end to end encryption, this is not a required feature to employ the tokenization disclosed herein.

The secure data is then transmitted to the payment system(s) 106, and the response may be returned in an encrypted format. Since the data is never in the clear, E2E payment methods ensures added security from potential vulnerability at the point of sale terminal 102. Further, when utilized in conjunction with multi-merchant tokens, the system's security is even more robust.

Figure 1:
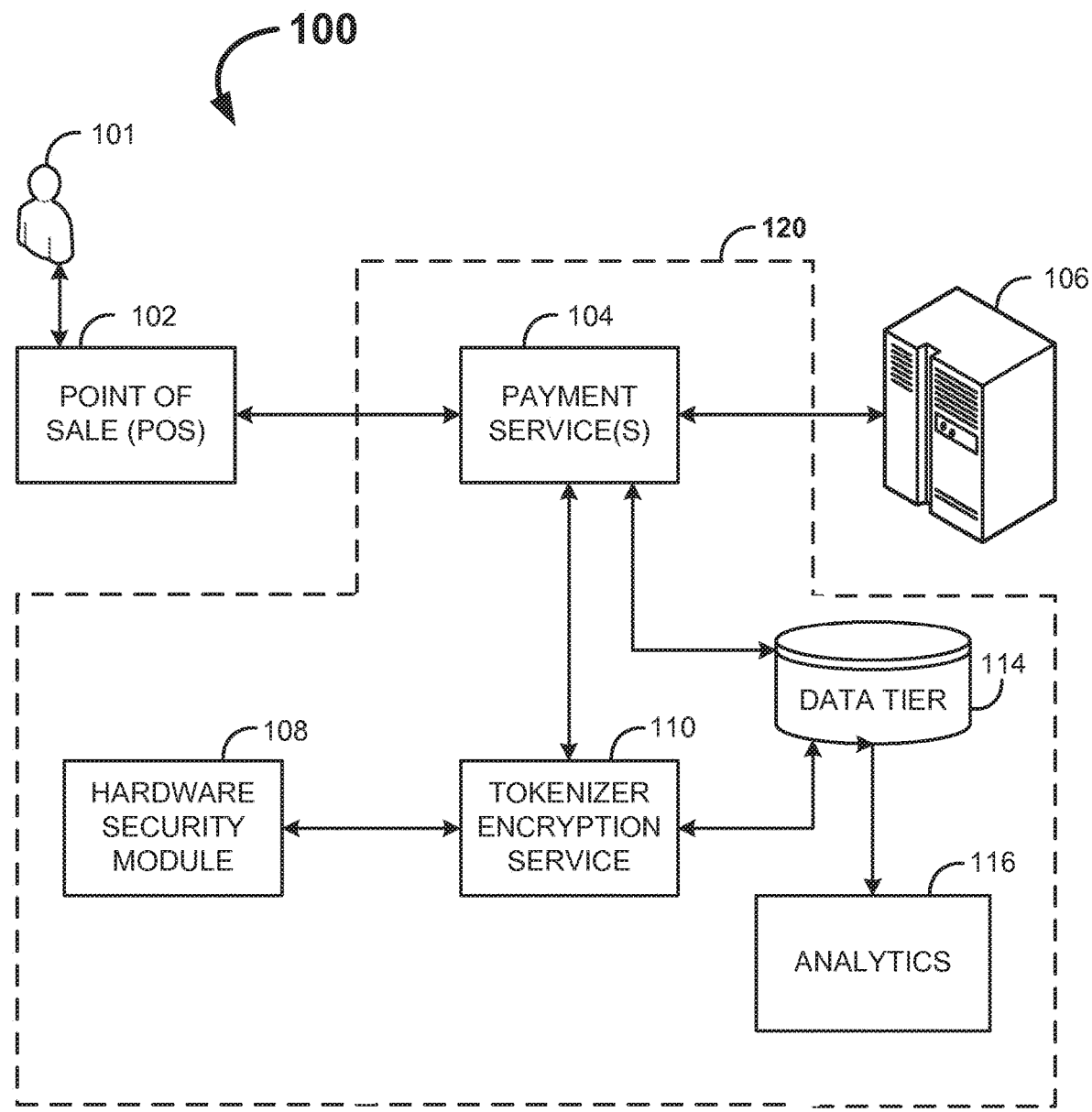
FIG. 1 is an example schematic block diagram for a system for multi-merchant tokenization, in accordance with some embodiments.

Turning to FIG. 1, an example schematic block diagram for a system for multi-merchant tokenization is provided, shown generally at 100. In this example block diagram, a purchaser 101 may be seen interacting with the point of sale terminal 102 in order to pay for a purchase, or otherwise settle a transaction. Typically the purchaser 101 provides a magnetically stored account number and expiration in the form of a credit card, but as previously discussed any form of sensitive payment information may be utilized, in some embodiments.

The point of sale 102 may include a fixed reader coupled to a terminal, an integrated cash register system, mobile payment application, or the like. As noted above, the point of sale terminal 102 may encrypt the collected data at the reader head in order to ensure security. Alternatively the initial encryption may be performed in software deeper in the point of sale terminal 102, in some embodiments. Software encryption, however, increases vulnerability to security breach if the point of sate terminal 102 has been compromised. Regardless of location of initial encryption, an encryption protocol may be employed, in some embodiments. This encryption protocol typically includes a merchant ID, amount for the transaction, passwords and an encrypted portion. The encrypted potion may be in the following format, in some embodiments:

```
<encryption>
    <block>
    <key>
    <serial number>
</encryption>
```

Note that while a specific encryption protocol is presented here, alternate known encryption schemas may be readily employed in alternate embodiments, The point of sale terminal 102 may be capable of providing the collected account information (and other sensitive information) to a payment service(s) 104 in the tokenization and payment management system 120 (payment processor). This transfer of data may be performed over the internet or via a dial in connection. The payment service(s) 104 may include a plurality of systems for receiving the data, dependent upon transmission mechanism and data type, as will be discussed in greater detail below. The payment service(s) 104 does an initial check for encryption of the data. If the received data is not encrypted, it may be transferred immediately to payment system(s) 106 for transfer of funds, or directly to entities such as Visa, MasterCard, etc. Payment system(s) 106 may include entities such as Global Card Bank, for example. However, where encryption is present, and tokenization is desired, the payment service(s) 104 may transfer the information to a tokenizer encryption service 110 for processing. The payment service(s) 104 validates the encrypted block, encrypted key and reader serial number lengths, It also validates the merchant's ID with a stored database of terminal IDs.

The tokenizer encryption service 110 validates credentials and identifies keys for the encrypted data. The tokenizer encryption service 110 may leverage a data tier 114 populated by analytics 116 system and CRM application(s) in order to perform validation and identification of keys. The data is then submitted to a hardware security module 108 for decryption and the generation of a token. The token includes a primary account number (PAN), a group ID (GID), an expiration date for the token, and an expiration date for the card.

In some embodiments, the expiration date of the token may be varied depending upon if the token is designated as a single use token, or for recurring transactions (i.e., a subscription). For example, a 1 year and 2 year expiration may be provided for a single use and recurring token, respectively. This allows for a longer validity period where the merchant is anticipating reuse of the token, and ensures that tokens are not stored unnecessarily long for single use tokens.

The token, which is encrypted, and clear text of the data supplied by the point of sale terminal 102 are returned to the tokenizer encryption service 110, and subsequently to the payment service(s) 104. The payment service(s) 104 transfers the clear text to the payment system(s) 106 for a transaction response. The response is then provided, along with the token, back to the merchant. The merchant may then store the encrypted token in a local database for later transactions.

Unlike current tokenization technology, the PAN (primary account number) is stored as part of the token, with the merchant, in encrypted form. The merchant cannot access the PAN without the keys maintained within the hardware security module 108. Thus, for account information to be compromised, both the merchant system and the tokenization and payment management system 120 would need to be breached. In all other known token based systems, the PAN is stored exclusively upon the payment processor's system, enabling a hacker to collect account information by breaching a single system.

Additionally, unlike other token based systems, the present system includes a GID (group ID) which enables more than one merchant to utilize the token. The data tier 114 maintains a copy of merchant IDs and correlates them with one or more GIDs. When a token is supplied to the system during a later transaction, the GID in the token is compared against the merchant ID listed in the data tier 114. If they match, then the tokenization and payment management system 120 may process the token.

Figure 2:
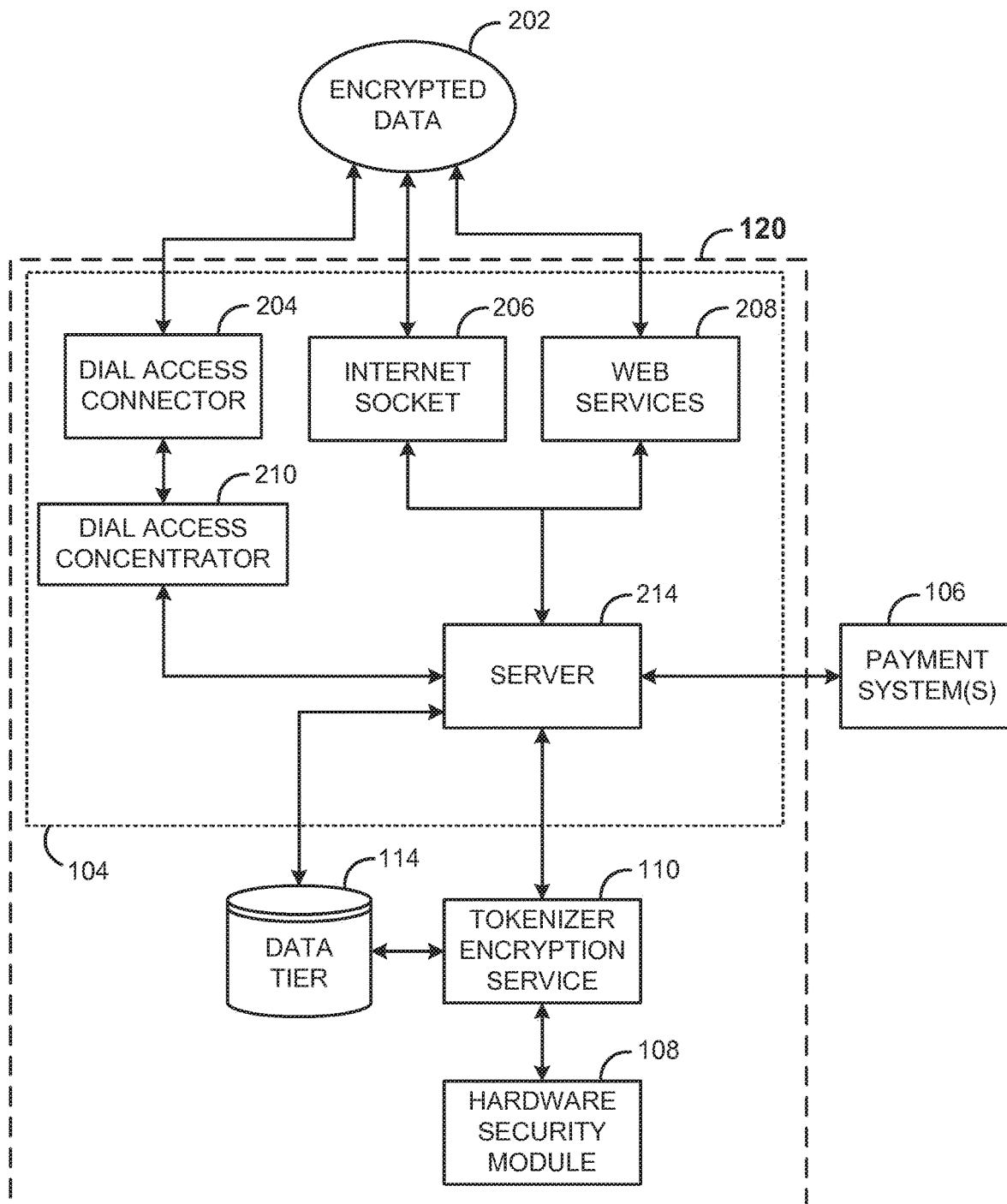
FIG. 2 is an example schematic block diagram for a more detailed view of components within the tokenization and payment management system, in accordance with some embodiments.

FIG. 2 is an example schematic block diagram for a more detailed view of components within the tokenization and payment management system, in accordance with some embodiments In this example block diagram, encrypted data 202 from the point of sale terminal 102 is seen being delivered to the payment service(s) 104 via any of a dial access connector 204, internet socket 206 or web services 208. When data is delivered to the dial access connector 204, it may pass through a dial access concentrator 210 prior to being provided to a server 214. If data passes through the interact socket 206 or web services 208, it may be supplied to the server 214.

In addition to the server 214, other servers may be included, in alternate embodiments, in order to handle alternate inputs. For example, in embodiments where gift cards or loyalty cards are being processed, the system may include a gift card server or loyalty card server. Generally, the system is designed to be scalable to take any number of payment types, as is desirable for any particular scenario.

The server 214 determines if token is present and/or if data is encrypted. If not encrypted and the merchant is not setup for tokenization, the clear text data is transferred to the payment system(s) 106 (such as Global Card Bank, Visa, etc.) for approval or declining. Otherwise, if the data includes a token or encrypted data, it may be provided to the tokenizer encryption service 110, as previously discussed.

Figure 3:
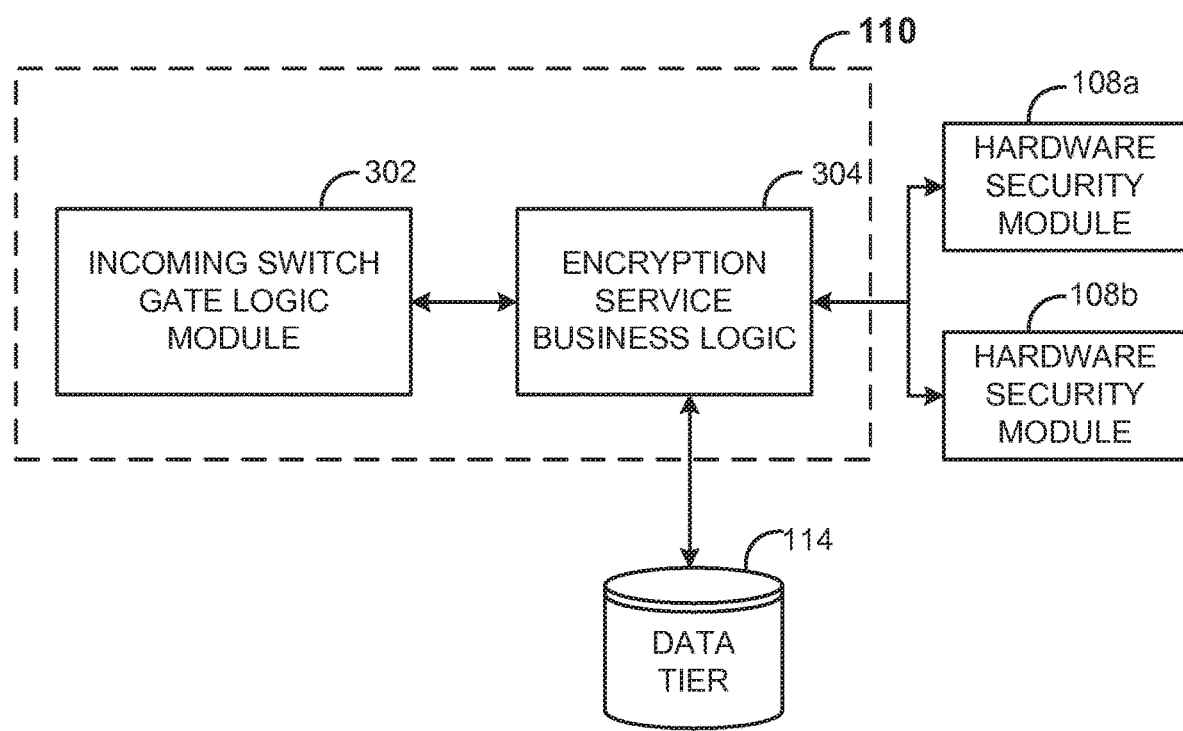
FIG. 3 is an example schematic block diagram for the tokenizer encryption service, in accordance with some embodiments.

FIG. 3 is an example schematic block diagram for the tokenizer encryption service 110, in accordance with some embodiments. This component may include two distinct modules: an incoming switch gate logic module 302 and an encryption service business logic 304. The incoming switch gate logic module 302 may validate credentials of the merchant, and the encryption service business logic 304 may identify keys for the data. The encryption service business logic 304 may access the data tier 114 and one or more hardware security module 108a and 108b. More than one hardware security module 108a and 108b may be employed for redundancy supporting failover and load balance.

Figure 4:
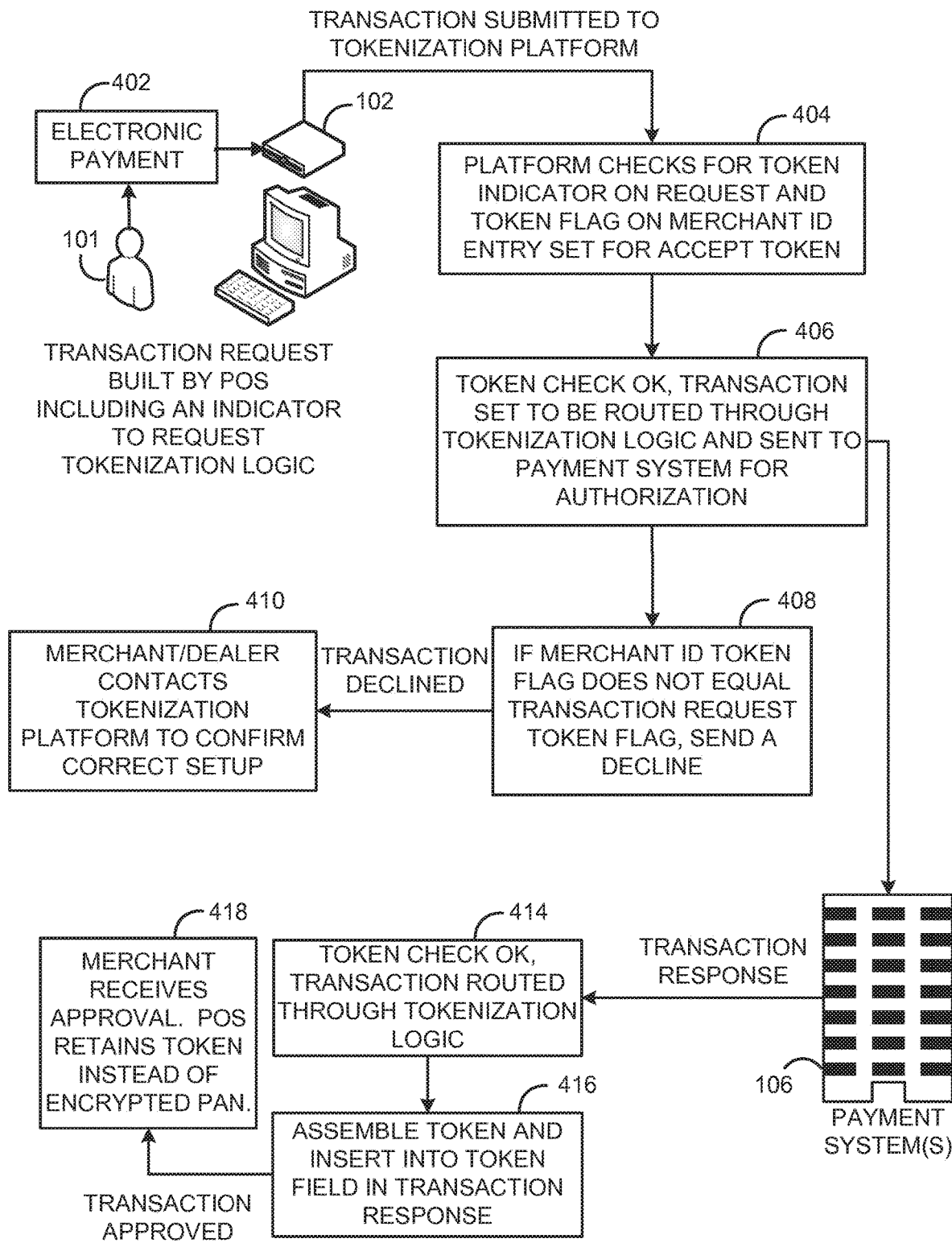
FIG. 4 is an example process flow diagram for multi-merchant tokenization, in accordance with some embodiments.

Lastly, FIG. 4 is an example process flow diagram flow diagram for multi-merchant tokenization system, in accordance with some embodiments. Here it is seen that a purchaser 101 makes an electronic payment 402 via a point of sale terminal 102. The transaction request built by the point of sale terminal 102 includes an indication requesting tokenization, in this example.

The transaction is submitted to the tokenization and payment management system 120, in this example, where the transaction data is checked for the token indicator (at 404). The merchant ID included in the transaction data is also compared against records to determine if the merchant is configured for tokenization. If the token indicator is present, and the merchant ID matches the ability to perform tokenization, then the transaction is set to be routed through tokenization logic, and is sent to the payment system(s) 106 for authorization (at 406).

If the merchant ID does not match the token indicator in the transaction, then a decline is sent back to the merchant (at 408). This is a sanity check that ensures that both the transaction and merchant configuration are in alignment prior to approving a transaction. Once the transaction is declined, the merchant may contact the tokenization and payment management system 120 to confirm correct setup if they believe the decline was in error.

If the transaction is approved by the payment system(s) 106, then the transaction may be sent through the tokenization logic (at 414). In alternate embodiments, the transaction is sent through the tokenization logic prior to approval by the payment system(s) 106, and the token is attached to the response by the payment systems) 106 regardless of approval status. As noted above, the token contemplated herein includes the primary account number, token expiration, card (or account number) expiration, and a group ID.

Once the token is assembled, it is inserted into a token field in the transaction response (at 416). The response is provided to the merchant where the approval is received, and the merchant retains the token instead of the primary account number.

II. Multi-Merchant Tokenization Methods

Figure 5:
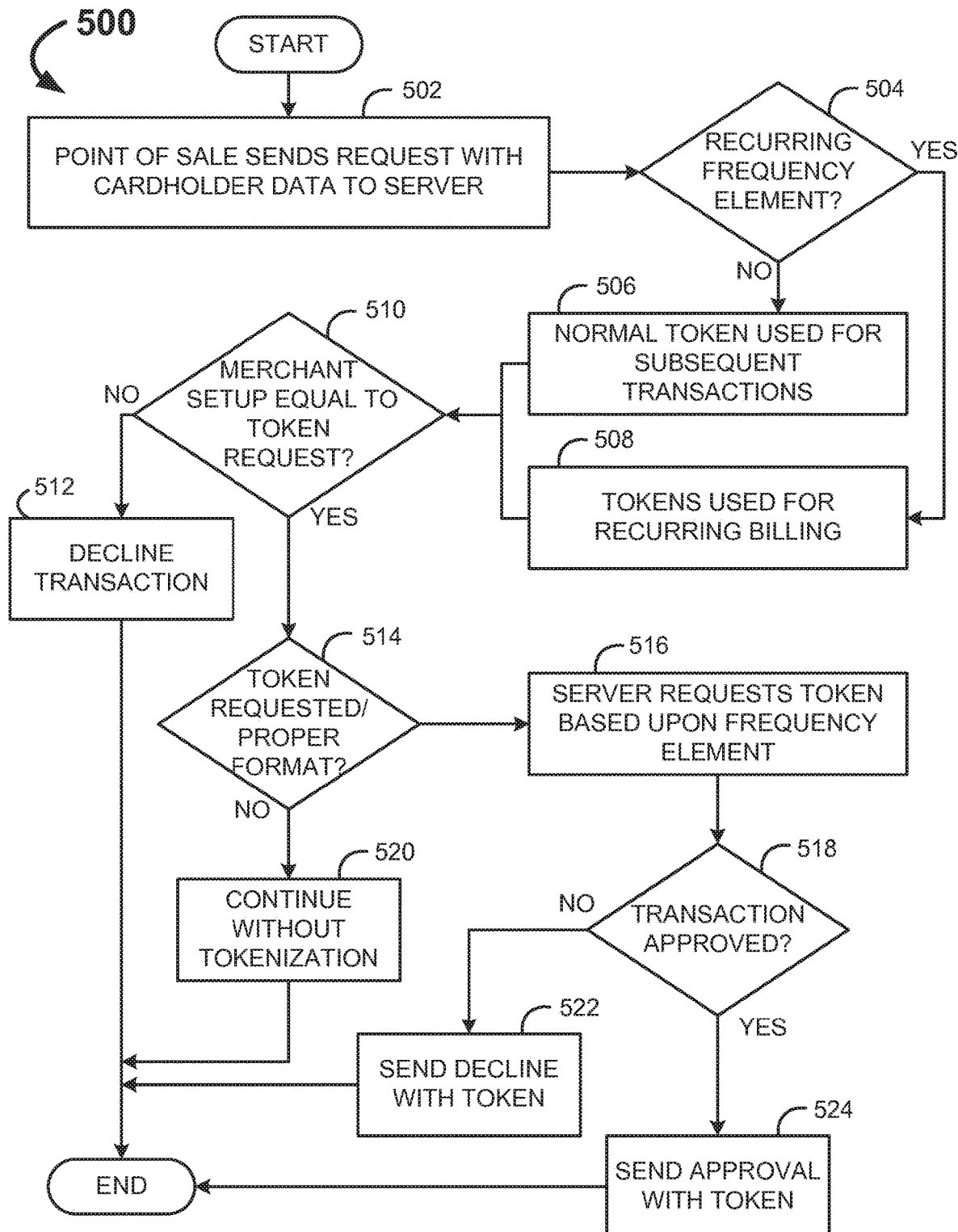
FIGS. 5-7 are example flowcharts for methods for multi-merchant tokenization, in accordance with some embodiments.

Now that embodiments of the basic system architecture have been described, FIG. 5 is presented to illustrate one embodiment of a method for multi-merchant tokenization, shown generally at 500. In this example process, the point of sale sends a request with the cardholder's data to the server (at 502). The server may determine if the request includes a recurring frequency element (at 504). If the request is for a recurring token, logic for a recurring billing token may be utilized (at 508). Alternatively, if the request is for a normal single use token, logic for this token may be utilized (at 506). Generally, recurring tokens may differ from normal tokens by having a longer period before they expire.

Next, the token request is compared against the merchant's setup (as stored a database) to make sure that the token request is in alignment to the merchant's configuration (at 510). if the merchant does not match the token request, the transaction may be declined (at 512). Otherwise, if there is a match between the request and the merchant's configuration, the system determines if a token is being requested (at 514). If no token is requested, the entire tokenization logic may be bypassed and the system may forward the transaction to the payment system(s) 106 without tokenization (at 520). In alternate embodiments, all transactions will be processed for a token regardless if a request for tokenization is present. In these embodiments, merchants that are configured. to accept tokens will receive them if they have submitted a correctly formatted transaction request. In these embodiments, only if the request is incorrectly formatted. will the tokenization process be bypassed or declined.

However, if tokenization is requested, the server may request a token (at 516) from the hardware security module 108 based upon the frequency element (normal or recurring). If the transaction is approved by the card brand (at 518), then the approval is returned to the merchant (at 524), or is otherwise declined (at 522). In some embodiments, regardless of transaction approval or decline, the token will be provided to the merchant along with the transaction response.

Figure 6:
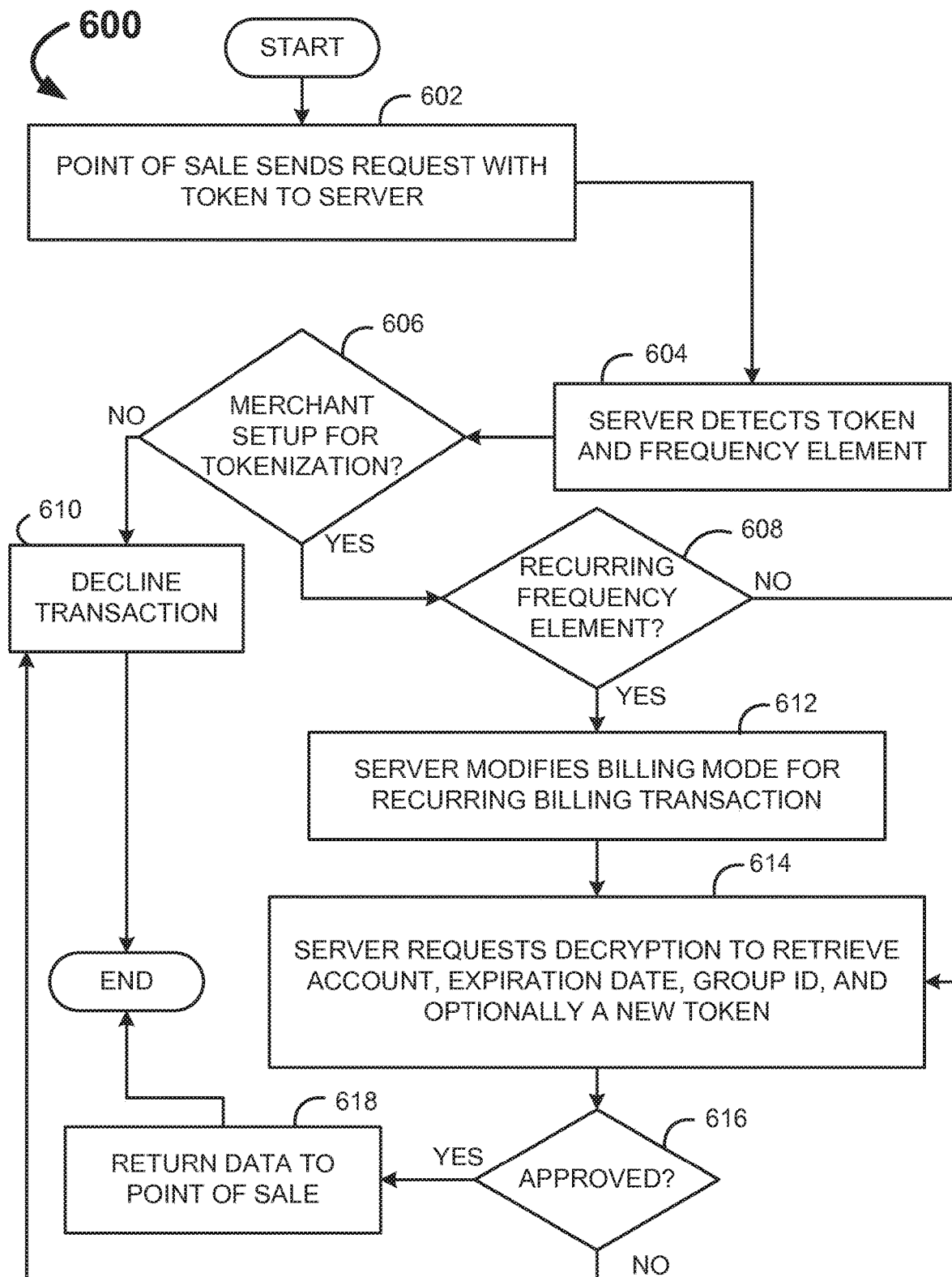

In an alternate method, as shown at 600 of FIG. 6, the point of sale terminal 102 sends a request to the tokenization and payment management system 120 with a token (at 602). The server detects the presence of the token, as well the frequency element of the token (at 604). The system next deter mines if the merchant is set up for tokenization by querying merchant account information (at 606). If the merchant is not set up for tokenization, the request will be denied (at 610). However, if the merchant is set up for tokenization, then the system may inquire if the frequency element is for a recurring token (at 608).

When a recurring frequency element is present, the server may modify billing mode for recurring billing transactions (at 612). After this, or if no recurring element is present, the tokenizer encryption service 110 requests decryption of the token from the hardware security module 108 to retrieve account numbers, expiration dates, group ID, and optionally the generation of an updated token (at 614). In some embodiments, every transaction may include updates of the token. This ensures tokens never become stale; however, alternate embodiments may keep existing tokens, or only update upon request, in some cases.

The decrypted token information is used to get approval from the payment system(s) 106 (at 616). An approval response (at 618) or declining response (at 610) may be provided back to the point of sale terminal 102. In cases where the token has been updated, the new token may accompany the response regardless of if it was approved. This new token may then be stored within the merchant's system for later use.

As previously noted, due to the presence of a group ID within the token, the system may also undergo a check to determine if the merchant is linked to the group ID. If so, the merchant is authorized to use the token. If not, the transaction may be declined.

Figure 7:
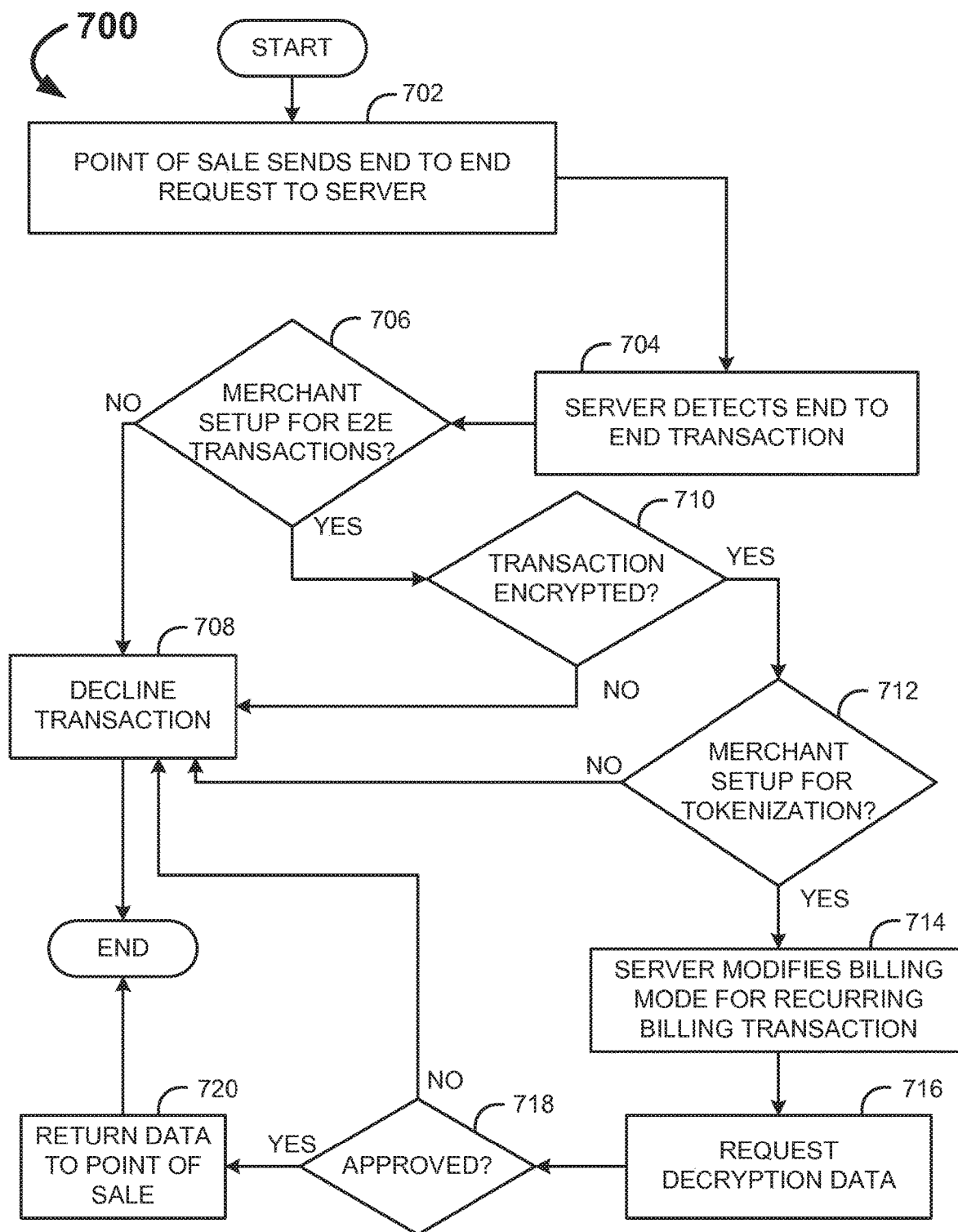

FIG. 7 provides yet another flow diagram for an embodiment for multi-merchant tokenization of transactions, shown generally at 700. In this example process, the point of sale sends an end to end request to the server (at 702). The server detects the end to end transaction (at 704) and ensures that the merchant is configured for such transactions by referencing merchant account data (at 706). If the merchant is not configured for end to end transactions, then the transaction is declined (at 708). However, if the merchant is set up for end to end transactions, the process then determines if the initial request is encrypted (at 710). Subsequently, the system determines if the merchant is configured for tokenization (at 712).

If the request was not encrypted, or if the merchant is not set up for tokenization, then the transaction is declined (at 708). However, if the merchant is configured for tokenization and the request was encrypted, the server modifies the billing mode (at 714) for recurring transactions (if the transaction is a recurring event), and the data is decrypted (at 716). The decrypted data is supplied to a payment system(s) 106 for approval (at 718) and if approved, the data may be returned to the merchant (at 720). Otherwise the transaction may be declined (at 708).

III. System Embodiments

Figure 9A:
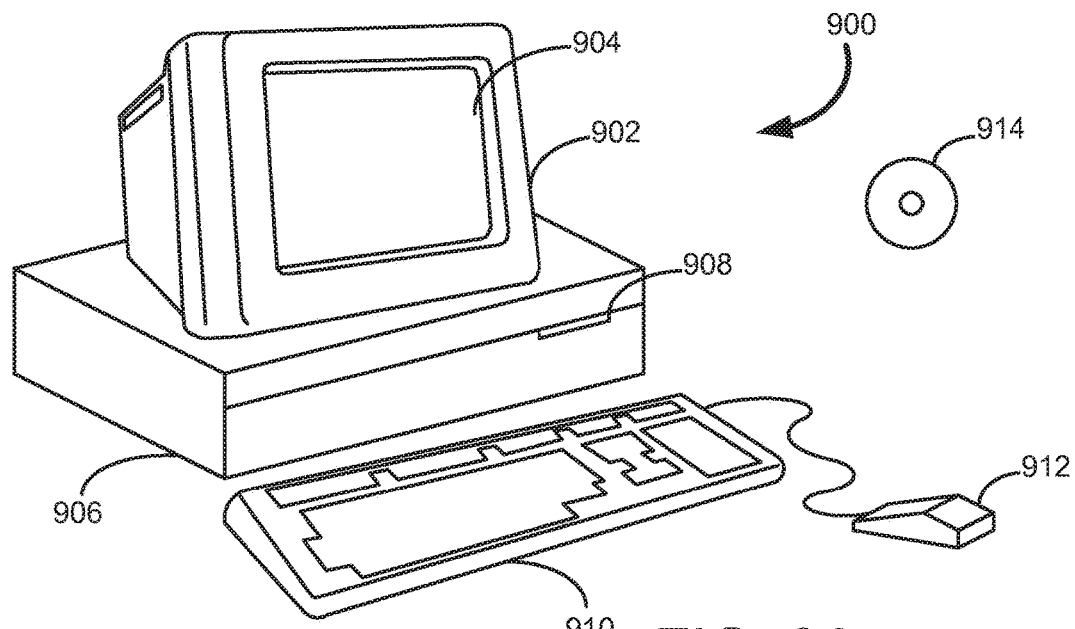
FIGS. 9A and 9B are example illustrations for computer systems configured to embody the multi-merchant tokenization system, in accordance with sortie embodiments.
Figure 9B:
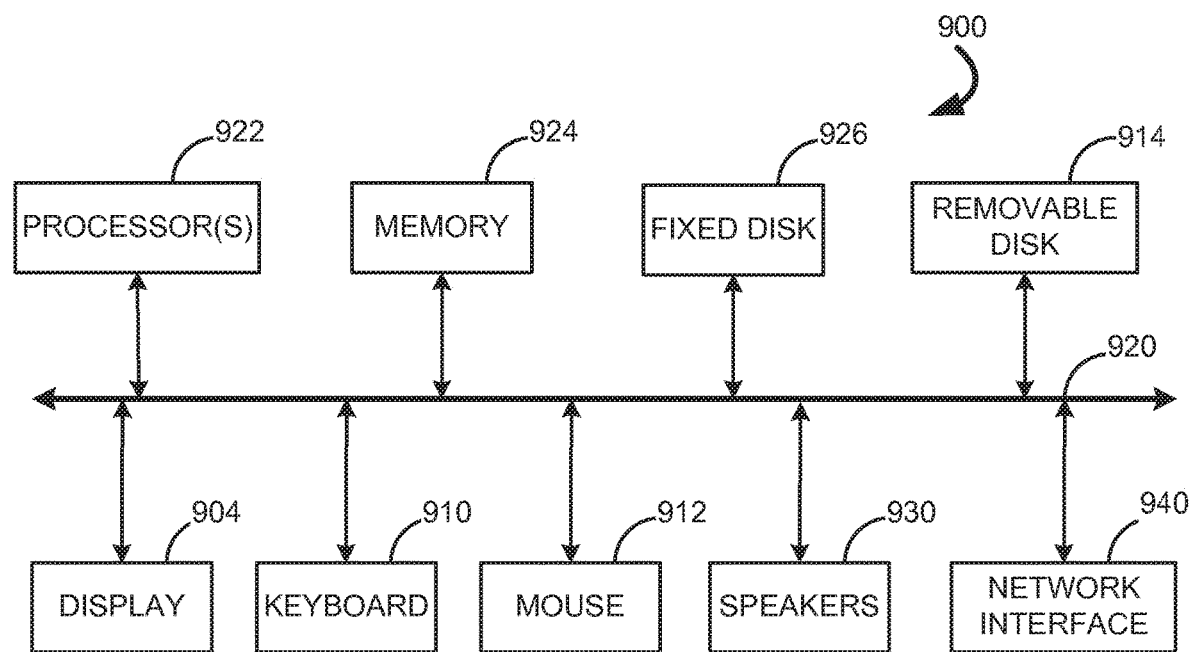

FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902; a Display 904, a Housing 906, a Disk Drive 908, a Keyboard 910, and a Mouse 912. Disk 914 is a computer-readable medium used to transfer data to and from Computer System 900.

In addition to the standard desktop, or server, computer system illustrated, it is fully within the scope of this disclosure that any computer system capable of the required storage and processing demands would be suitable for embodying the present invention. This may include tablet devices, smart, phones, pin pad devices, and any other computer devices, whether mobile or even distributed on a network (i.e., cloud based).

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 926 may also be coupled bi-directionally to the Processor 922; it provides additional data storage capacity and may also include any of the computer-readable media described below. Fixed Disk 926 may be used to store programs, data, and the like and is typically a secondary storage medium (such as a hard disk) that is slower than primary storage. It will be appreciated that the information retained within Fixed Disk 926 may, in appropriate cases, be incorporated in standard fashion as virtual memory in Memory 924. Removable Disk 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 922 optionally may be coupled to another computer or telecommunications network using Network Interface 940. With such a Network Interface 940, it is contemplated that the Processor 922 might receive information from the network, or might output information to the network in the course of performing the above-described multi-merchant tokenization. Furthermore, method embodiments of the present invention may execute solely upon Processor 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present disclosure provides systems and methods for multi-merchant tokenization. Such systems and methods enable transactions to be performed in more a secure manner. Account information is stored in tokens upon merchant systems which eliminates risk for payment processor systems. Further, through the incorporation of group ID into the token, multiple merchants may be able to redeem tokens in an unprecedented manner.

While this invention has been described in terms of several embodiments, there are alterations, modifications, permutations, and substitute equivalents, which fall within the scope of this invention.

It should also be noted that there are many alternative ways of implementing the methods and systems of the present invention. It is therefore intended that the following appended claims be interpreted as including all such alterations, modifications, permutations, and substitute equivalents as fail within the true spirit and scope of the present invention.

What is claimed is:

1. A method for multi-merchant tokenization, the method comprising:
   receiving, by a first point of sale (POS) terminal, transaction data associated with a first electronic request;
   encrypting, by the first POS terminal via an encryption protocol, sensitive information of the transaction data at a reader head of the first POS terminal;
   receiving, by a multi-merchant tokenization system, the first electronic request from the first POS terminal, wherein the first electronic request includes a first merchant ID and an encrypted primary account number;
   processing. by the multi-merchant tokenization system, the first electronic request to validate the first merchant ID and the encrypted primary account number;
   identifying, by the multi-merchant tokenization system, at least one key for the encrypted primary account number;
   correlating, by the multi-merchant tokenization system, the first merchant ID with at least one group ID from a plurality of group IDs;
   decrypting, by the multi-merchant tokenization system via the at least one key, the encrypted primary account number in the first electronic request into a primary account number;
   generating, by the multi-merchant tokenization system, an encrypted token comprising the at least one correlated group ID and the decrypted primary account number; and
   outputting, by the multi-merchant tokenization system, the encrypted token in a user interface of the first POS terminal.

2. The method of claim 1, wherein generating, by the multi-merchant tokenization system, the encrypted token comprises:
   tokenizing the primary account number; and
   encrypting the tokenized primary account number.

3. The method of claim 1, further comprising:
storing, by the multi-merchant tokenization system, a decryption key corresponding to the encrypted token.

4. The method of claim 1, wherein the first electronic request further includes a frequency element, and
when the frequency element is a recurring frequency element, the multi-merchant tokenization system sets a token expiration date in the encrypted token to a period allowing for multiple repeated transactions.

5. The method of claim 1, wherein the at least one group ID defines a selected group of merchants to redeem the encrypted token.

6. The method of claim 1, further comprising:
upon detecting a tokenization indicator in the first electronic request, validating, by the multi-merchant tokenization system, the first merchant ID against merchant IDs of merchants configured for tokenization.

7. The method of claim 1, further comprising:
querying, by the multi-merchant tokenization system, a database for merchant configuration; and
declining, by the multi-merchant tokenization system, the first electronic request if the merchant configuration does not match the first electronic request.

8. The method of claim 1, further comprising:
inserting, by the multi-merchant tokenization system, the encrypted token into a token field of an electronic transaction authorization response; and
transmitting, by the multi-merchant tokenization system, the electronic transaction authorization response to a payment system.

9. The method of claim 1, further comprising:
receiving, by the multi-merchant tokenization system, a second electronic request comprising the encrypted token and a second merchant ID from a second POS terminal;
retrieving, by the multi-merchant tokenization system, the at least one group ID and the primary account number from the encrypted token by decrypting the encrypted token;
comparing, by the multi-merchant tokenization system, the second merchant ID to the retrieved at least one group ID;
providing, by the multi-merchant tokenization system, the retrieved primary account number to a payment system;
receiving, by the multi-merchant tokenization system, an authorization response from the payment system; and
outputting, by the multi-merchant tokenization system, the authorization response to the second POS terminal.

10. A system for multi-merchant tokenization, the system comprising;
one or more processors; and
one or more computer readable media comprising instructions which, when executed by the one or more processors, cause the one or more processors to perform operations comprising:
receiving, by a first point of sale (POS) terminal, transaction data associated with a first electronic request;
encrypting, by the first POS terminal via an encryption protocol, sensitive information of the transaction data at a reader head of the first POS terminal;
receiving, by a multi-merchant tokenization system, the first electronic request from the first POS terminal, wherein the first electronic request includes a first merchant ID and an encrypted primary account number;
processing, by the multi-merchant tokenization system, the first electronic request to validate the first merchant ID and the encrypted primary account number:
identifying, by the multi-merchant tokenization system, at least one key for the encrypted primary account number;
correlating, by the multi-merchant tokenization system, the first merchant ID with at least one group ID from a plurality of group IDs;
decrypting, by the multi-merchant tokenization system via the at least one key, the encrypted primary account number in the first electronic request into a primary account number;
generating, by the multi-merchant tokenization system, an encrypted token comprising the at least one correlated group ID and the decrypted primary account number; and
outputting, by the multi-merchant tokenization system, the encrypted token in a user interface of the first POS terminal.

11. The system of claim 10, wherein generating, by the multi-merchant tokenization system, the encrypted token comprises:
tokenizing the primary account number; and
encrypting the tokenized primary account number.

12. The system of claim 10, the operations further comprising:
storing, by the multi-merchant tokenization system, a decryption key corresponding to the encrypted token.

13. The system of claim 10, wherein the first electronic request further includes a frequency element, and
when the frequency element is a recurring frequency element, the multi-merchant tokenization system sets a token expiration date in the encrypted token to a period allowing for multiple repeated transactions.

14. The system of claim 10, wherein the at least one group ID defines a selected group of merchants to redeem the encrypted token.

15. The system of claim 10, the operations further comprising:
upon detecting a tokenization indicator in the first electronic request, validating, by the multi-merchant tokenization system, the first merchant D against merchant IDs of merchants configured for tokenization.

16. The system of claim 10, the operations further comprising:
querying, by the multi-merchant okenization system, a database for merchant configuration; and
declining, by the multi-merchant tokenization system, the first electronic request if the merchant configuration does not match the first electronic request.

17. The system of claim 10, the operations further comprising:
inserting, by the multi-merchant tokenization system, the encrypted token into a token field of an electronic transaction authorization response; and
transmitting, by the multi-merchant tokenization system, the electronic transaction authorization response to a payment system.

18. The system of claim 10, the operations further comprising:
receiving, by the multi-merchant tokenization system, a second electronic request comprising the encrypted token and a second merchant ID from a second POS terminal;

retrieving, by the multi-merchant tokenization system, the at least one group ID and the primary account number from the encrypted token by decrypting the encrypted token;

comparing, by the multi-merchant tokenization system, the second merchant ID to the retrieved at least one group ID;

providing, by the multi-merchant tokenization system, the retrieved primary account number to a payment system;

receiving, by the multi-merchant tokenization system, an authorization response from the payment system; and outputting, by the multi-merchantokenization system, he authorization response to the second POS terminal.

19. One or more non-transitory computer readable media comprising instructions which, when executed by one or more processors, cause the one or more processors to perform operations comprising:

receiving, by a first point of sale (POS) terminal, transaction data associated with a first electronic request;

encrypting, by the first POS terminal via an encryption protocol, sensitive information of the transaction data at a reader head of the first POS terminal;

receiving, by a multi-merchant tokenization system, the first electronic request from the first POS terminal, wherein the first electronic request includes a first merchant ID and an encrypted primary account number;

processing, by the mufti-merchant tokenization system, the first electronic request to validate the first merchant ID and the encrypted primary account number;

identifying, by the multi-merchant tokenization system, at least one key for the encrypted primary account number;

correlating, by the multi-merchant tokenization system, the first merchant ID with at least one group ID from a plurality of group IDs;

decrypting, by the multi-merchant tokenization system via the at least one key, the encrypted primary account number in the first electronic request into a primary account number;

generating, by the multi-merchant tokenization system, an encrypted token comprising the at least one correlated group ID and the decrypted primary account number; and outputting, by the multi-merchant tokenization system, the encrypted token in a user interface of the first POS terminal.

20. The one or more non-transitory computer readable media of claim 19, wherein the at least one group ID defines a selected group of merchants to redeem the encrypted token.

* * * * *

UNITED STATES PATENT AND TRADEMARK OFFICE
CERTIFICATE OF CORRECTION

PATENT NO. : 11,328,293 B2
APPLICATION NO. : 16/887638
DATED : May 10, 2022
INVENTOR(S) : Michelle K. Plomske, Charles E. Watts and Matthew D. Ozvat It is certified that error appears in the above-identified patent and that said Letters Patent is hereby corrected as shown below:

In the Claims

In Column 11, Line 51 of Claim 10, delete "comprising;" and insert --comprising:--.

In Column 12, Line 45 of Claim 15, delete "D" and insert --ID--.

In Column 12, Line 49 of Claim 16, delete "okenization" and insert --tokenization--.

In Column 13, Line 12 of Claim 18, delete "multi-merchantokenization" and insert --multi-merchant tokenization--.

In Column 13, Line 12 of Claim 18, delete "he" and insert --the--.

In Column 14, Line 1 of Claim 19, delete "mufti-merchant" and insert --multi-merchant--.

Signed and Sealed this
Fifth Day of July, 2022

Katherine Kelly Vidal
*Director of the United States Patent and Trademark Office*